United States Patent [19]

Horng

[11] Patent Number: 5,093,599

[45] Date of Patent: * Mar. 3, 1992

[54] NON-BRUSH D.C. MOTOR WITH NEW IMPROVED STATOR

[76] Inventor: Alex Horng, No. 149, Yi-Yung Rd., Lin Ya Dist., Kaohsiung, Taiwan

[*] Notice: The portion of the term of this patent subsequent to Jan. 22, 2008 has been disclaimed.

[21] Appl. No.: 668,018

[22] Filed: Mar. 12, 1991

[30] Foreign Application Priority Data

Feb. 26, 1991 [TW] Taiwan ............... 80202253

[51] Int. Cl.$^5$ .................. H02K 1/12; H02K 3/00; H02K 1/00; H02K 11/00
[52] U.S. Cl. .................. 310/254; 310/67 R; 310/194; 310/DIG. 6
[58] Field of Search ............ 310/40 MM, 43, 49 A, 310/49 R, 67 R, 68 R, 177, 179, 194, 216, 217, 218, 254, 259

[56] References Cited

U.S. PATENT DOCUMENTS

| | | | |
|---|---|---|---|
| 2,323,035 | 6/1943 | Hansen | 310/254 |
| 3,274,411 | 9/1966 | Kavanaugh | 310/164 |
| 3,634,707 | 1/1972 | Tillner et al. | 310/172 |
| 4,280,072 | 7/1981 | Gotou et al. | 310/67 R |
| 4,748,362 | 5/1988 | Hedlund | 310/254 |
| 4,783,608 | 11/1988 | Gruber et al. | 310/67 R |
| 4,823,034 | 4/1989 | Wrobel | 310/67 R |
| 4,841,190 | 6/1989 | Matsushita et al. | 310/49 R |
| 4,874,975 | 10/1989 | Hertrich | 310/254 |
| 4,934,041 | 6/1990 | Hoover et al. | 310/42 |
| 4,987,331 | 1/1991 | Horng | 310/254 |

FOREIGN PATENT DOCUMENTS

| | | | |
|---|---|---|---|
| 0299512 | 1/1989 | European Pat. Off. | 310/177 |
| 0007864 | 1/1990 | Japan | 310/268 |

Primary Examiner—Steven L. Stephan
Assistant Examiner—C. LaBalle
Attorney, Agent, or Firm—Fleit, Jacobson, Cohn, Price, Holman & Stern

[57] ABSTRACT

A non-brush D.C. motor with a new improved stator comprises a stator abse whose two side discs have notches and feet so that the polar plates can engage with. By expanding the thinner lips of metal cylinder, the upper and lower polar plates can be fixed firmly with stator base. The central shaft post of housing base can pass through the inner perimeter of metal cylinder.

8 Claims, 2 Drawing Sheets

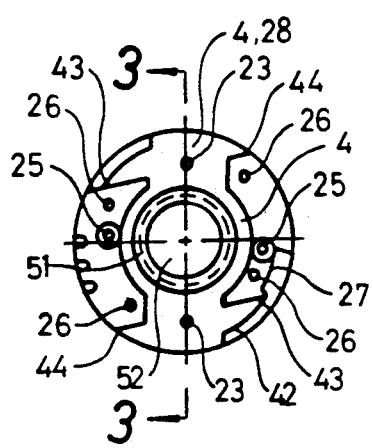
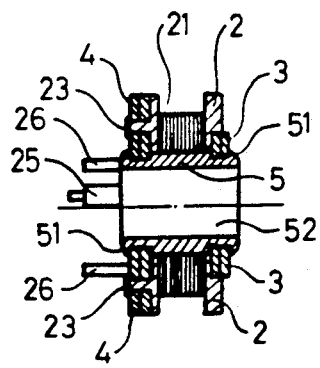
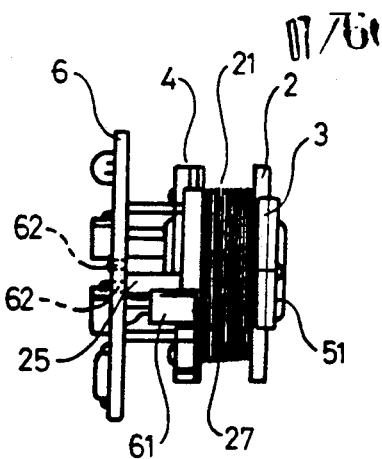
FIG.2  FIG.3  FIG.4
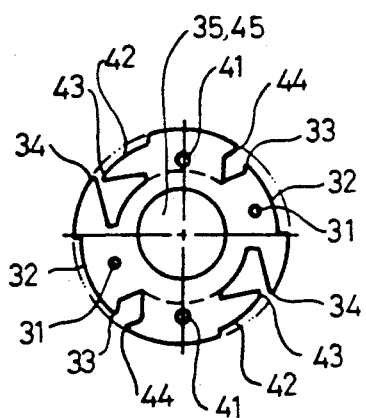
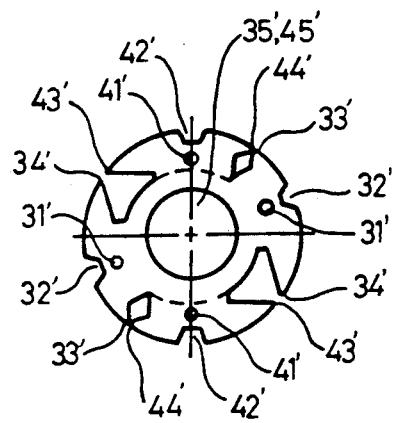
FIG.5  FIG.6
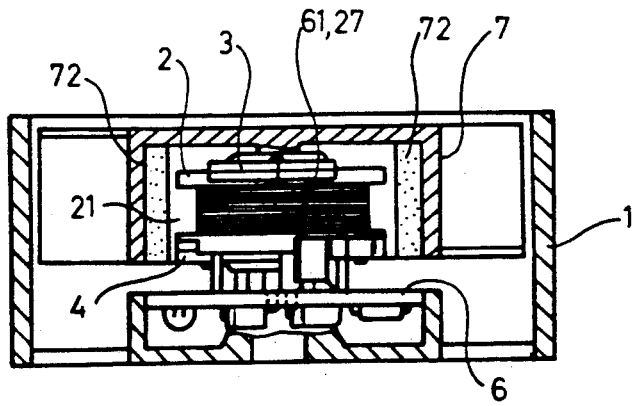
FIG.7

NON-BRUSH D.C. MOTOR WITH NEW IMPROVED STATOR

BACKGROUND OF THE INVENTION

This invention relates to a non-brush D.C. motor with a new improved stator. According to the former application case of the U.S. Pat. No. 4,987,331, a non-brush D.C. motor with an improved stator is constituted by a base made of plastics having sides, a coil winding around the base, two magnetic polar plates each forming a pair of magnetic poles fixed at both sides of the base, and a circuit board connected at one side of the base. The advantages of that invention are easy to manufacture, no environmental pollution caused by using varnish, low installation cost, and the low rate of defective products.

SUMMARY OF THE INVENTION

The purpose of this invention is again to improve the stator so that the assembly work will be easier, and the thrust and repulsion of the motor will increase to start easily.

The new improved stator of a non-brush D.C. motor comprises a stator base with two side discs having feet and notches which have the same shape as two polar plates. The feet pass through two polar plates and the holes of circuit board so that two polar plates and the circuit board can be firmly fixed. The central opening of stator base is to insert through a metal cylinder which has a pair of thinner lips expanded to fix two polar plates.

BRIEF DESCRIPTION OF THE DRAWINGS

This invention will now be described in detail with reference to the accompanying drawings wherein;

FIG. 2 is a bottom view of stator base combined with magnetic polar plates;

FIG. 3 is a cross-sectional view taken along line 3—3 of FIG. 2;

FIG. 4 is a side view of stator base combined with magnetic polar plates and circuit board;

FIG. 5 is the first example of stator base combined with upper and lower magnetic polar plates;

FIG. 6 is the second example of stator base combined with upper and lower magnetic polar plates; and FIG. 7 is a top view of the non-brush D.C. motor in accordance with this invention.

DETAILED DESCRIPTION OF THE INVENTION

Figure 1:
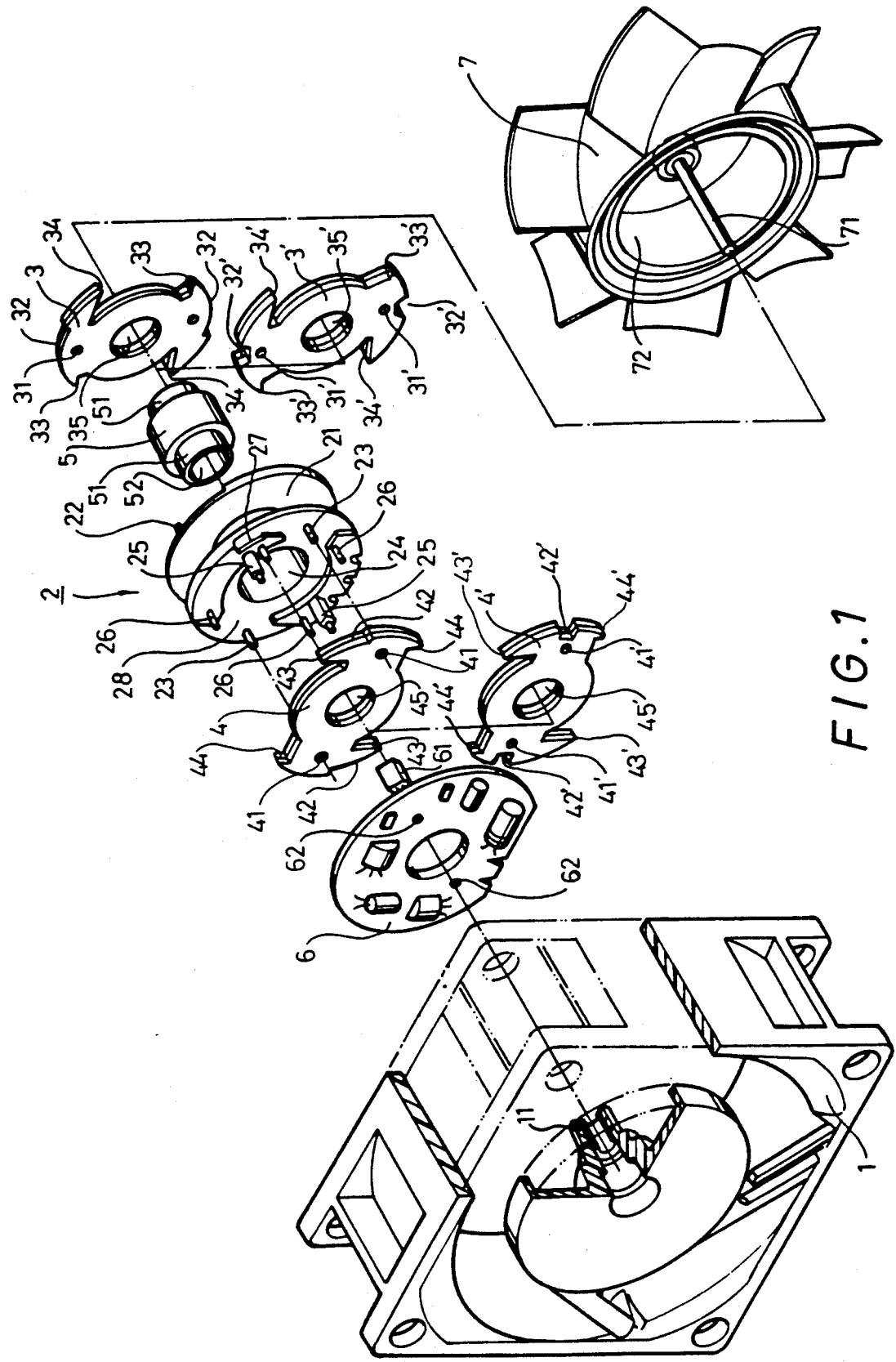
FIG. 1 is a solid exploded perspective of the non-brush D.C. motor in accordance with this invention.

First, referring to FIG. 1, a non-brush D.C. motor in accordance with this invention comprises a housing base 1 with a central shaft post 11. The outer perimeter of the central shaft post 11 is to provide the constituting elements of the stator to combine. The inner perimeter of the central shaft post 11 has a bearing inside to provide the shaft 71 of rotor 7 to insert and rotate.

The stator comprises a stator base 2, upper polar plate 3, lower polar plate 4, a metal cylinder 5, and a circuit board 6, etc..

The stator base 2 is a winding wheel made of plastics with two side discs. The central perimeter 21 of stator base 2 is wound by the coil. Two side discs have two sets of feet 22, 23 symmetrically protruding out, and notches 28 which have the same shape as upper and lower polar plates 3, 4. The notches 28 are to engage with polar plates 3, 4. The polar plates 3, 4 are firmly fixed with stator base 2 by means of feet 22, 23 passing through the holes 31, 41 of polar plates 3, 4. The central hole 24 located at the center of stator base 2 is to provide metal cylinder 5 to insert. The stator base has feet 25 which are to provide the hole 62 of circuit board 6 to combine, and has another feet 26 which support the surface of circuit board 6 to let them keep suitable spacing as shown in FIG. 4. The stator base 2 has hole 27 to settle the IC 61 firmly.

The upper polar plate 3 and lower polar plate 4 are engaged with the notches 28 of respective discs of stator base 2. The holes 31, 41 of polar plates 3, 4 are to provide the feet 22, 23 of stator base 2 to insert. The holes 35, 45 of polar plates 3, 4 are to provide the thinner lips 51 of metal cylinder 5 to insert. The thinner lips 51 are expanded by punching method, as shown in FIG. 3, to fix polar plates 3, 4 and stator base 2 firmly.

Each polar plate consists of at least one plate segmented into respective poles. The segmental dents (peripheral recesses) 32, 42 are at the respective pole of polar plates 3, 4. The air gap between the segmental dents 32, 42 and the permanent magnet 72 of rotor 7 is to increase the starting torque for rotor 7 starting easier by the different magnetic flux distribution at the magnetic poles. The rear part 33 of each pole of upper polar plate 3 (considered in the direction of rotation of the rotor) and the front part 44 of each pole on lower polar plate 4 form a gap. Also the front part 34 of each pole on upper polar plate 3 and the rear part 43 of each pole one lower polar plate 4 can be aligned, overlap, or leave some gap, as shown in FIG. 5, for better characteristics of magnetic induction. The polar plates can be designed as another form like upper polar plates 3' and lower polar plates 4' as shown in FIGS. 1, 6. Each pole face of polar plates 3' or 4' has a respective dent 32' or 42' so that the different air gap between pole faces and the permanent magnet 72 of rotor 7 results different reluctance. The rotor 7 will increase the starting torque for starting easily because of the non-uniform magnetic flux in the magnetic poles. Moreover, the polar plates 3, 4 or the polar plates 3', 4' can be bipolar, quadrupolar, octopolar, etc..

The outer perimeter of metal cylinder consists of one wider central part and two thinner lips 51. The central part of metal cylinder is to combine with stator base 2. Two thinner lips 51 are to provide polar plates 3, 4 to fix. By punching and expanding, two thinner lips 51 will combine polar plates 3, 4 with stator base 2 and metal cylinder 5. The inner perimeter 52 of metal cylinder 5 is to provide the central shaft post 11 of housing base 1 to pass through.

Circuit board 6 will be fixed firmly by using holes 62 to set in the feet 25 of stator base 2. The electronic elements inside the circuit board 6 are used as driving circuit for starting the motor. The IC 61 of circuit board 6 is firmly fixed in the groove 27 of stator base 2.

The non-brush D.C. motor in accordance with this invention is more compact than the former one. The assembly work will be easier and no varnish is used in manufacturing process to pollute the environment. Moreover, less electric leakage and better insulation effect in manufacturing will reduce the defect rate of products.

What is claimed is:

1. A brushless D.C. motor comprising a housing base having a central shaft post supporting a stator, and a bearing in said central shaft post rotatably supporting a shaft of a rotor, said stator of comprising a stator base made of plastic and including a coil winding wheel with two side discs having outer surfaces with notches, polar plates received in and conforming in shape with said notches, feet provided on the respective discs engaging in respective holes in said polar plates and a circuit board adjacent one of said polar plates, the circuit board also having holes engaged with respective ones of said feet, said stator base having a central hole with a metal cylinder engaged therein, the metal cylinder having end lips fixed to said polar plates, each polar plate being segmented into discrete poles including poles having peripheral recesses to form enlarged air gaps between a permanent magnet of the rotor and said recesses, each pole having a front part and a rear part in a direction of rotation of the rotor, gaps formed between the front parts of the poles on one of said polar plates and the back parts of poles on the other of said polar plates, and said metal cylinder being seated on said central shaft post of the housing base.

2. The D.C. motor as claimed in claim 1 wherein each said pole is formed with a peripheral recess.

3. The D.C. motor as claimed in claim 1 wherein said polar plates each having at least two poles.

4. The D.C. motor as claimed in claim 1 wherein one of said side discs of the stator base has a groove to receive an IC of the circuit board.

5. The D.C. motor as claimed in claim 1 wherein the end lips of said cylinder are expanded outwardly to fix the cylinder to the respective polar plates.

6. The D.C. motor as claimed in claim 1 including gaps formed between the back parts of the poles on said one of said polar plates and the front parts of the poles on said other said polar plates.

7. The D.C. motor as claimed in claim 1 wherein the back parts of the poles on said one of said polar plates overlap the front parts of the poles on said other of said polar plates.

8. The D.C. motor as claimed in claim 1 wherein the back parts of the poles on said one of said polar plates are aligned with the front parts of the poles on said other of said polar plates.

* * * * *